Dec. 22, 1942.  T. SHIMIZU  2,305,797
ROTARY PRIME MOVER
Filed March 12, 1940  3 Sheets-Sheet 1
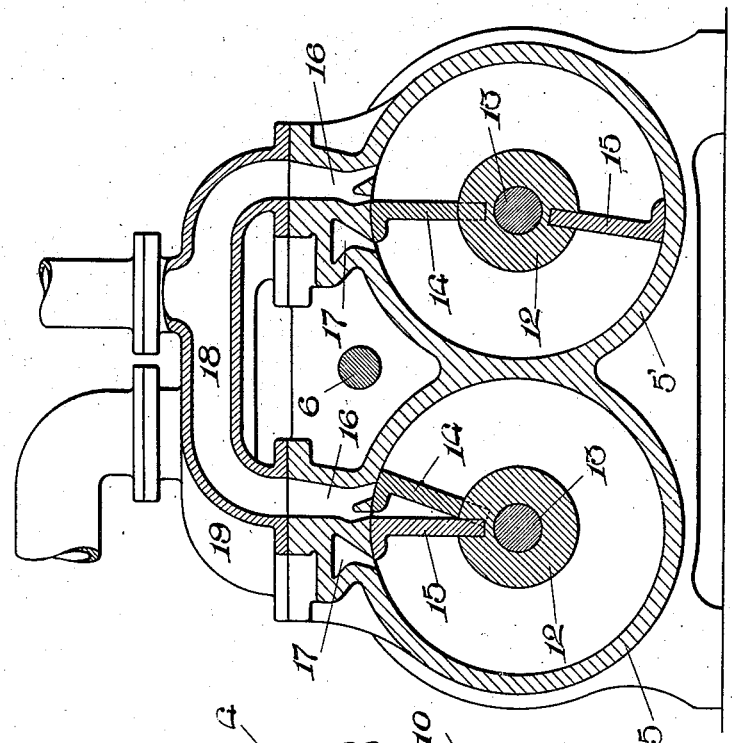
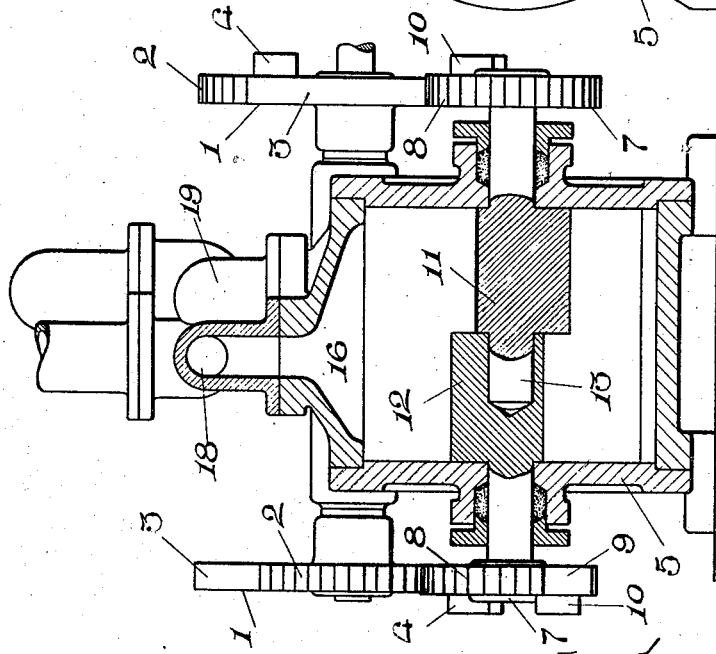
Inventor,
T. Shimizu
By: Glascock Downing Seebold
Attys.

Dec. 22, 1942. T. SHIMIZU 2,305,797
ROTARY PRIME MOVER
Filed March 12, 1940 3 Sheets-Sheet 2

Inventor;
T. Shimizu
By Glascock Downing Seeball
Attys.

Dec. 22, 1942.  T. SHIMIZU  2,305,797
ROTARY PRIME MOVER
Filed March 12, 1940   3 Sheets-Sheet 3

Inventor,
T. Shimizu
By: Glascock Downing & Seebold
Attys.

Patented Dec. 22, 1942

2,305,797

UNITED STATES PATENT OFFICE 2,305,797

ROTARY PRIME MOVER

Toyomasa Shimizu, Naka-ku, Yokohama, Kanagawa-ken, Japan; vested in the Alien Property Custodian Application March 12, 1940, Serial No. 323,623
In Japan March 15, 1939

1 Claim. (Cl. 121—49)

The present invention relates to a simple and convenient rotary prime mover.

The object of the invention is to rotate an axle in a cylinder continuously by means of simple gear arrangement, without resorting to valve, clutch or other complicated arrangements.

Another object of the invention is to obtain the arrangement in a small compact space, even in using double cylinder system.

Still another object is in that by rotating the main shaft from outside, the prime mover or motor may be efficiently used as a pump.

The annexed drawings show the present invention by way of example and show a case with double cylinders.

Fig. 1 shows a sectional elevation.

Fig. 2 shows its sectional side elevation.

In the present invention, a special gear arrangement is employed i. e., a driven wheel with teeth on part of its circumference and toothless face on the remaining portion, is used, while the drive wheel has teeth on a portion of circumference and toothless face on the remaining portion which engages the toothless face of the driven wheels. A pair of such driven wheels is mounted on the main axle in such manner that the toothed portions are located on opposite positions.

The engaging drive wheels are mounted on and fixed to their respective axial plate shafts and arranged in such manner that they may freely revolve.

Then fluid under pressure is introduced in the cylinder in such a manner that two axial plates are made to revolve for one revolution alternately.

By the relation of the moving axial plate and idle one and through the gear arrangement, the main axle is made to constantly revolve in one direction.

Full explanation will be given referring to an example of the application of the invention.

Figure 3:
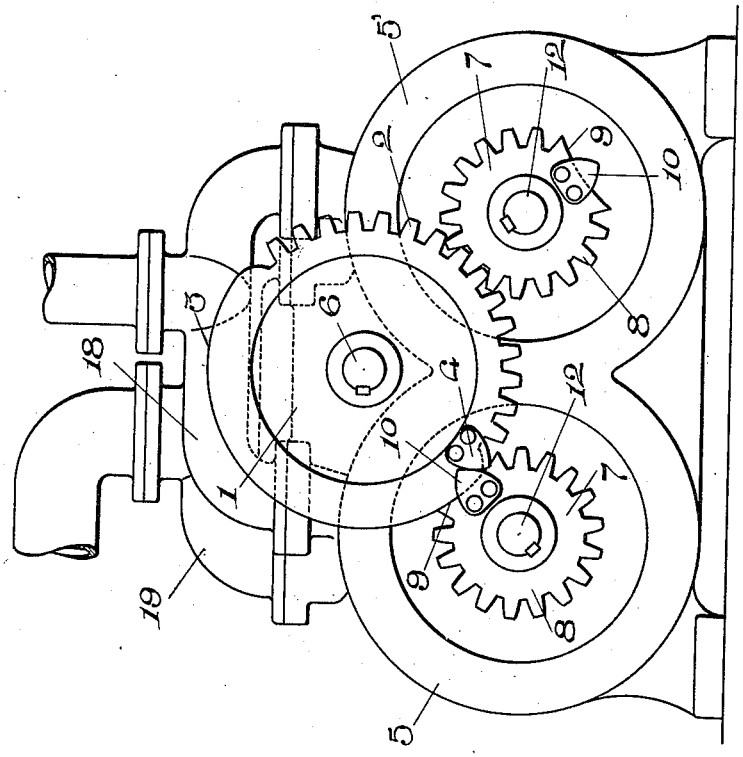
Fig. 3 shows an elevation, showing gear relations.

Driven wheel 1 shown on Fig. 3 and others, has the usual teeth cut on approximately half of the circumference of the wheel while the remaining portion is finished as toothless face 3.

At one end of the toothed portion, a guide piece 4 is fixed as shown.

Two driven wheels 1 constitute a set A and B. These wheels are located so that the toothed portion of the one is located opposite to the toothed portion of the other as shown on Fig. 6.

Drive wheels 7 have half the diameter of the driven wheels 1 and have teeth 8 cut long enough to engage with teeth 2 and a small portion of toothless face 9 which engages with the blank portion 3 of the driven wheel.

Tooth shaped guide piece 10 is provided and made to engage with guide piece 4 of driven wheel 1 so as to enable the toothed parts to gear together.

Figure 6:
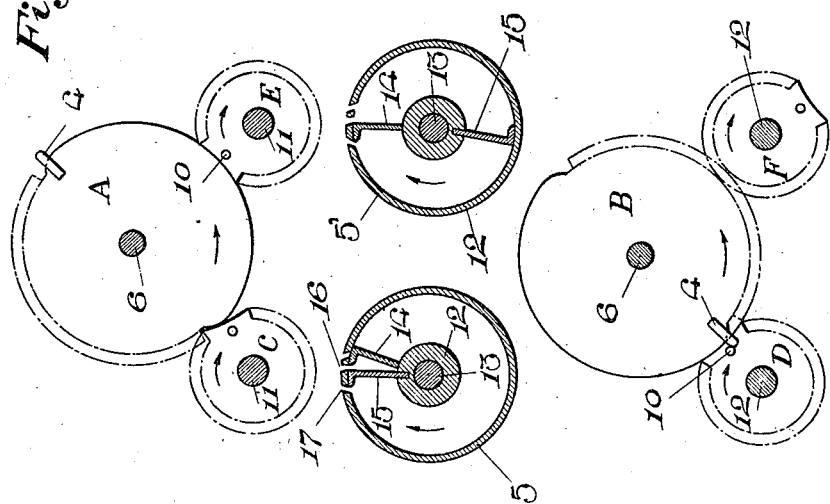
Fig. 4, Fig. 5 and Fig. 6 are drawings showing relations of gear wheels and axial plates.

Two drive wheels 7 constitute a set and are fitted in such manner that their locations are slightly different as shown on Fig. 6.

They are mounted on the outer sides of axial plate shafts 11 and 12 as indicated on Fig. 2.

The axial plate axles 11 and 12 are mounted across the cylinders 5 going through them.

At the middle portion of cylinder 5, they are enlarged and engaged so as to be in one line and freely able to revolve relative to each other.

As shown on Fig. 2, the end of shaft 11 is finished into short shaft or axial extension of smaller diameter 13 which fits into the cavity or axial recess provided at the end of other axle 12; thus they are free to relatively revolve and stable at the same time.

On the axles, axial plates 14 and 15 are provided so as to revolve round and to fit tightly on the inner sides of the cylinders.

These axial plates have bent ends as shown in order to make the bearing surfaces as large as possible.

Pressure fluid inlet 16 and outlet 17 are provided in the cylinder, close together; no valve is provided but inlet pipe 18 and outlet pipe 19 are connected as shown.

The relative positions of radial plates and toothed wheels under the conditions shown on Fig. 1 to Fig. 3, are shown on Fig. 6.

Figure 4:
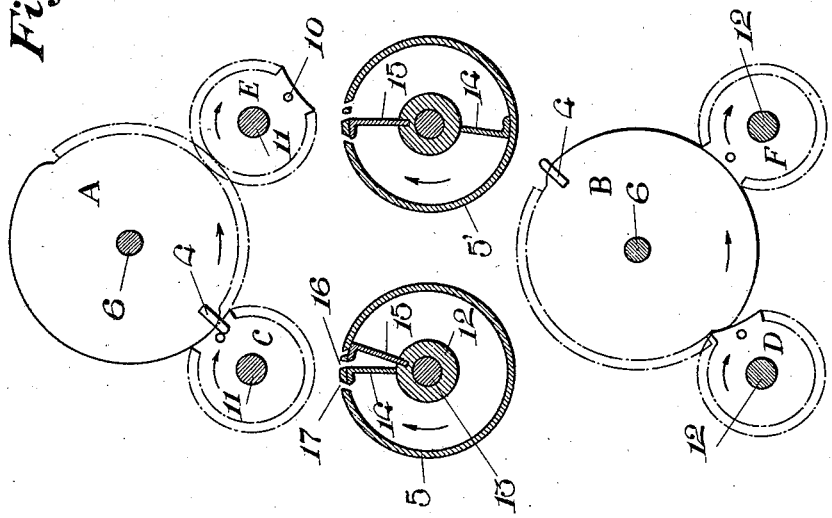

Next let us consider the conditions shown on Fig. 4; suppose that fluid under pressure is introduced to cylinder 5 from the inlet 16.

Figure 5:
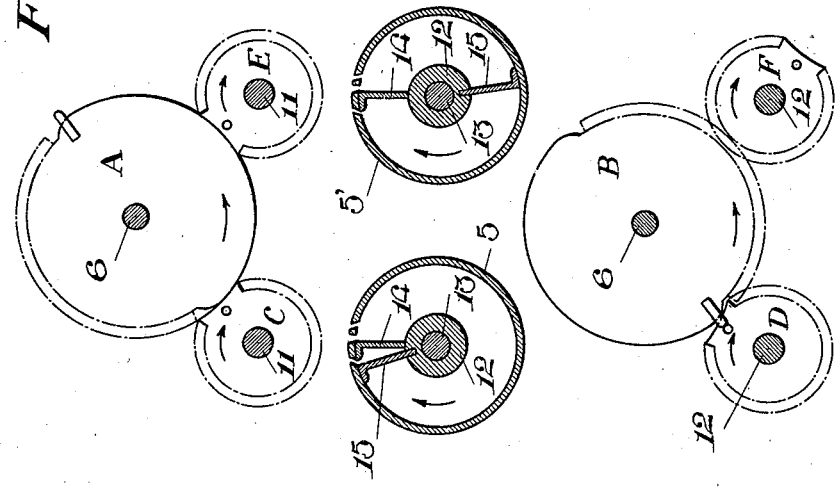

Then the blank face of drive wheel C, comes in contact with blank face of drive wheel A and does not rotate radial plate 14 and therefore makes the partitions between inlet 16 and outlet 17; while the other radial plate 15 is rotated by the pressure fluid and drive wheel D revolves round while rotating driven wheel B as shown on the condition given on Fig. 5.

Radial plate 15 continues to rotate and at the same time, driven wheel A commences to gear with drive wheel C and radial plate 14 is still rotated.

When radial plate 15 stops at intermediate position between inlet 16 and outlet 17 as shown on Fig. 6, the other radial plate 14 is rotated on account of pressure fluid which flows to the cylinder 5 from inlet 16 and wheel A is rotated through wheel C.

Thus alternately radial plate 14 and 15 are rotated by pressure fluid and through medium of wheel C and D and wheel A and B, main axle 6, is constantly rotated in one direction.

In the present invention, another cylinder 5' may be provided as shown; then similar provisions may be applied and wheels A and B may be commonly used; wheels E and F may be made to engage with them.

In this way, two or more cylinders may be used, which will balance the rotating power of the main axle 6.

It will be seen that in the present invention, special gear arrangement is used and fluid under pressure is made to act on two radial plates; and therefore valve or other complicated arrangement is not needed; a main shaft is made to rotate constantly in one direction, making the entire construction qute simple.

Whole system may be made to be built in one compact form; two or more cylinders may be compositely arranged thus balancing the rotating power of main shaft.

For fluid under pressure, water under head, compressed air or steam may be used.

The system of this invention may be appropriately employed as a simple prime mover.

If main shaft is rotated from the outer side, this system may be efficiently employed as a pump.

Having now described and ascertained the nature of my invention, I declare that what I claim is as follows:

A device of the character described, comprising a cylinder, a driven shaft arranged outside the cylinder, a mutilated driven gear fixed on each end of said shaft, the toothed portion of each of said gears being diametrically opposite one another, a pair of axially aligned drive shafts arranged within said cylinder and projecting outwardly from opposite ends thereof, said drive shafts being disposed parallel to said driven shaft, the meeting portions of said drive shafts being enlarged, one of said enlarged portions being axially recessed, a reduced axial shaft extension on the other drive shaft journalled in the axial recess, a piston plate fixed on the enlarged portion of each drive shaft and rotatable independently of one another, a mutilated drive gear of smaller diameter than the driven gears fixed to the projecting outer end of each drive shaft and adapted to engage with one of said driven gears, whereby the toothed portion of one of said drive gears will mesh with the toothed portion of one of the driven gears while the other one of said drive gears engages the smooth surface of the second mutilated driven gear, and vice versa, means for introducing a pressure fluid into said cylinder for alternately rotating said piston plates, and an outlet in said cylinder for discharging said pressure fluid.

TOYOMASA SHIMIZU.